G. AMBORN.
BAR HOLDER FOR LATHES.
APPLICATION FILED FEB. 12, 1912.

1,166,804.

Patented Jan. 4, 1916.

WITNESSES:
René Bruine
Fred White

INVENTOR:
George Amborn,
By Attorneys,
Fraser Turk & Myles

UNITED STATES PATENT OFFICE.

GEORGE AMBORN, OF CHAPINVILLE, CONNECTICUT, ASSIGNOR TO J. H. WILLIAMS & CO., OF BROOKLYN, NEW YORK, A CORPORATION OF NEW YORK.

BAR-HOLDER FOR LATHES.

1,166,804.  Specification of Letters Patent.  Patented Jan. 4, 1916.

Application filed February 12, 1912. Serial No. 677,158.

*To all whom it may concern:*

Be it known that I, GEORGE AMBORN, a citizen of the United States, residing at Chapinville, in the county of Litchfield and State of Connecticut, have invented certain new and useful Improvements in Bar-Holders for Lathes, of which the following is a specification.

This invention aims to provide certain improvements in bar holders for lathes.

The improved construction is simple in design, holds the tool-holding bar at a most convenient angle, or adjustably at any angle desired, and clamps easily and firmly all parts of various sizes.

The accompanying drawings illustrate an apparatus embodying the invention.

Figure 1:
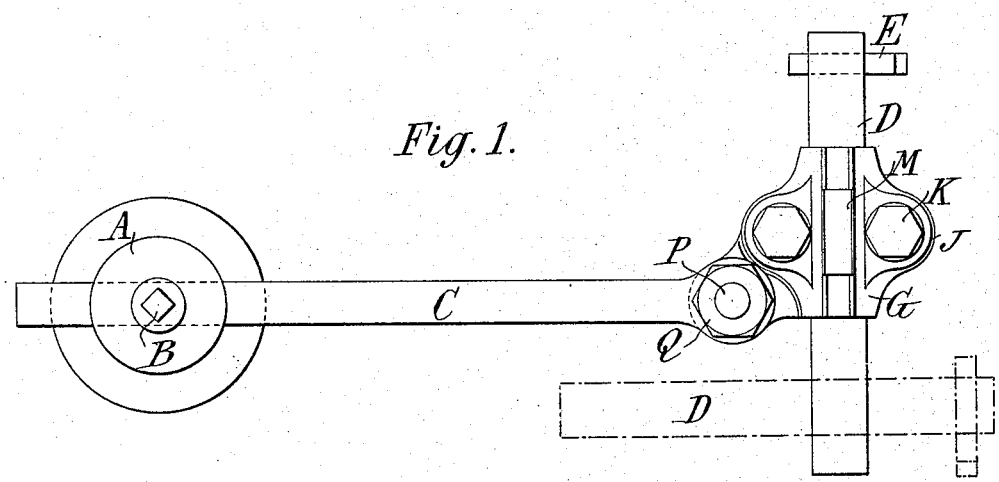
Figure 2:
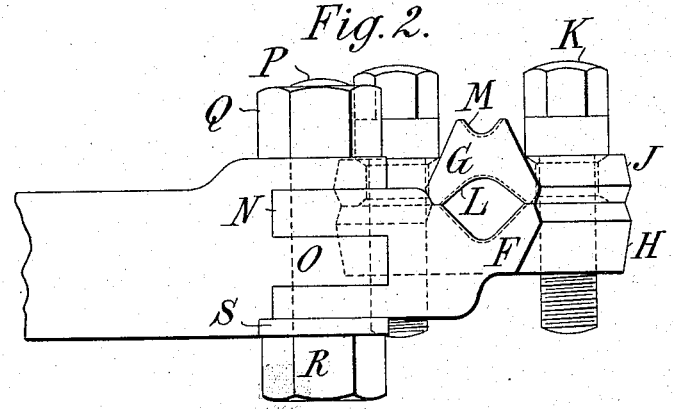
Figure 4:
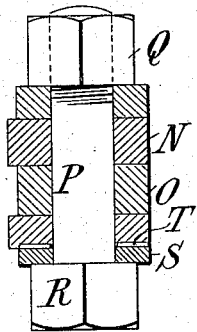
Figure 5:
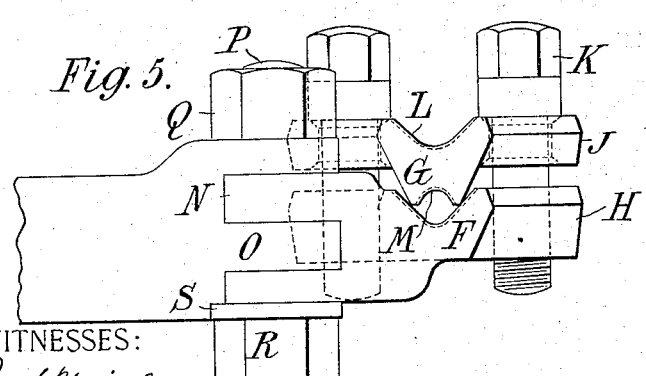
Figure 3:
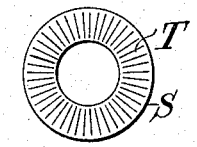

Figure 1 shows a tool carried in a bar which in turn is carried in a bar holder fastened to the lathe post, the view being in plan and indicating in dotted lines the angular adjustment of the tool; Fig. 2 is a side elevation of the clamp end of the bar holder of Fig. 1; Fig. 3 is a plan of a locking washer used in the holder of Fig. 2; Fig. 4 is a vertical section through the angular adjustment device of Fig 2; Fig. 5 is a view similar to Fig 2, showing the clamping means set for a tool holding bar of a different size.

Referring now to the embodiment of the invention illustrated, the lathe post A has means, such as the set-screw B, for clamping the end of the shank C of the bar holder, the shank having at its outer end suitable clamping means for clamping the tool holding bar D, which in turn carries means for clamping the tool E.

The clamping means on the bar holder is composed of a pair of grooved jaws, one jaw F being formed in the end of the bar holder, and the other jaw G being a separate cap; the two jaws being provided with ears H and J at opposite sides by which they are fastened together by means of bolts K passing through the ears J and screwing into the ears H. The jaw F is made with a groove sufficiently large to take the largest tool holding bar contemplated. The other jaw or cap G is provided on its opposite faces with grooves L and M designed to accommodate respectively the largest and the smallest tool holding bars which are to be clamped between the jaws. The cap G is tapered in width toward the smaller groove M, so that when it is inverted it can enter the comparatively large groove of the jaw F sufficiently to clamp the smallest size of tool holding bar. For the intermediate sizes the groove M will also be used; and for the larger sizes, large enough to hold the jaws from contact with each other, the larger groove L of the cap will be used.

In the construction shown, however, the lower jaw F of the clamping means is fastened to the shank C by a hinge joint, the jaw having ears N and the shank having ears O, these ears being apertured for the passage of a hinge pin P having a head on its lower end and a nut Q screwed on its upper end. Between the head R of the bolt and the adjacent face of the jaw F, is interposed a washer S the upper part of which is provided with a series of radial projections T triangular in cross-section and adapted to interlock with similar radial triangular projections on the end face of the adjacent ear of the jaw F. This permits of setting the entire clamping means, and with it of course the tool holding bar, at any desired angle, and locking it firmly at such angle.

The boring bars may be of any usual or suitable design; such, for example, as are shown in my application No. 796,282, filed October 20, 1913, and permitting a certain angular adjustment of the cutter relative to the bar in which it is held. The details of the bar holder illustrated may be varied without departing from the invention as stated in the following claims.

What I claim is:—

1. A bar holder for lathes having a shank adapted for attachment to the lathe post and a clamping device including jaws and means for clamping the bar between said jaws, said clamping device being adjustable angularly relatively to the shank, and means for fastening said clamping device in such angular positions on the shank, said fastening means serving independently of the clamping means for positively locking the clamping device against the strains of use.

2. A bar holder for lathes having a shank adapted for attachment to the lathe post and a clamping device for clamping the bar, said clamping device comprising a pair of grooved jaws extending laterally beyond the bar at both sides and bolts at opposite sides of the bar engaging said lateral extensions for clamping said jaws together on the bar, and additional means for fastening one of said jaws in different angular positions on the shank.

3. A bar holder for lathes having a shank adapted for attachment to the lathe post and a clamping device for clamping the bar, said clamping device comprising a pair of grooved jaws extending laterally beyond the bar at both sides and bolts at opposite sides of the bar engaging said lateral extensions for clamping said jaws together on the bar, one of said jaws being fastened by a hinge joint to the shank so as to be adjustable angularly, and means for fastening said clamping device in such angular positions on the shank, said fastening means serving independently of the clamping means for positively locking the clamping device against the strains of use.

In witness whereof, I have hereunto signed my name in the presence of two subscribing witnesses.

GEORGE AMBORN.

Witnesses:
CHARLES B. HARRIS,
WILLIAM G. COLE.

Copies of this patent may be obtained for five cents each, by addressing the "Commissioner of Patents, Washington, D. C."